United States Patent
Kominato et al.

(10) Patent No.: US 11,951,919 B2
(45) Date of Patent: Apr. 9, 2024

(54) IN-VEHICLE POWER SUPPLY SYSTEM

(71) Applicant: Yazaki Corporation, Tokyo (JP)

(72) Inventors: Yasuhiro Kominato, Makinohara (JP); Sadaharu Okuda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/859,579

(22) Filed: Jul. 7, 2022

(65) Prior Publication Data

US 2023/0036795 A1 Feb. 2, 2023

(30) Foreign Application Priority Data

Jul. 28, 2021 (JP) .................................. 2021-123530

(51) Int. Cl.
*B60R 16/033* (2006.01)
*H02J 7/00* (2006.01)
*H02J 7/34* (2006.01)

(52) U.S. Cl.
CPC .......... *B60R 16/033* (2013.01); *H02J 7/0063* (2013.01); *H02J 7/0068* (2013.01); *H02J 7/345* (2013.01); *H02J 2207/20* (2020.01)

(58) Field of Classification Search
CPC ..... B60R 16/033; H02J 7/0063; H02J 7/0068; H02J 7/345; H02J 2207/20
See application file for complete search history.

(56) References Cited

U.S. PATENT DOCUMENTS

| | | | |
|---|---|---|---|
| 10,958,096 B2* | 3/2021 | Hida | H02J 7/342 |
| 2003/0030324 A1 | 2/2003 | Tamai et al. | |
| 2004/0112320 A1 | 6/2004 | Bolz et al. | |
| 2015/0352968 A1* | 12/2015 | Date | B60L 53/55 307/10.1 |
| 2016/0339858 A1* | 11/2016 | Fink | B60R 16/033 |
| 2019/0334375 A1 | 10/2019 | Wataru et al. | |

FOREIGN PATENT DOCUMENTS

| | | |
|---|---|---|
| AT | 512132 B1 | 1/2016 |
| DE | 10 2010 046 616 A1 | 3/2012 |
| DE | 10 2017 124 943 A1 | 4/2019 |
| EP | 3 067 240 A1 | 9/2016 |
| EP | 3 476 648 A1 | 5/2019 |
| JP | 2003-48497 A | 2/2003 |
| JP | 2004-518079 A | 6/2004 |
| JP | 2016-137803 A | 8/2016 |
| JP | 2018-182936 A | 11/2018 |
| JP | 2019-193517 A | 10/2019 |
| WO | 2006/136380 A1 | 12/2006 |

* cited by examiner

*Primary Examiner* — Carlos Amaya
(74) *Attorney, Agent, or Firm* — Sughrue Mion, PLLC

(57) ABSTRACT

An in-vehicle power supply system includes: a main battery; an upper power supply unit configured to supply power of a power supply to the main battery; a first power supply line allocated to conduct the power of the power supply of a first voltage; a second power supply line allocated to conduct the power of the power supply of a second voltage lower than the first voltage; a step-down conversion unit configured to step down a voltage of the first power supply line to supply the power of the power supply to the second power supply line; and a capacitor. The upper power supply unit, the capacitor, and an input of the step-down conversion unit are connected to the first power supply line. The main battery and an output of the step-down conversion unit are connected to the second power supply line.

3 Claims, 6 Drawing Sheets

IN-VEHICLE POWER SUPPLY SYSTEM

CROSS-REFERENCE TO RELATED APPLICATIONS

This application is based on and claims priority under 35 USC 119 from Japanese Patent Application No. 2021-123530 filed on Jul. 28, 2021, the contents of which are incorporated herein by reference.

TECHNICAL FIELD

The present disclosure relates to an in-vehicle power supply system.

BACKGROUND ART

In related art, in an auxiliary device system of a general vehicle, a power supply including an alternator (generator) and an in-vehicle battery capable of supplying power of a power supply having a voltage of 12 V supplies power of the power supply, which is required by various electrical components, to the various electrical components via a wire harness routed in each part of the vehicle.

For example, power supply redundancy system of JP-A-2019-193517 includes a plurality of power supplies that handle two types of voltages of 12 V and 48 V. Since a power supply voltage can be converted using a DC/DC converter provided in the power supply, electric power can be supplied to a load even when a ground fault or a short circuit occurs in one of power supply systems.

SUMMARY OF INVENTION

An auxiliary device system on a vehicle is provided with a large number of electrical components of various types. Among these electrical components, a large electric power load that consumes a very large current and a small electric power load that consumes a small current are mixed. Examples of the large electric power load on the vehicle include an electric stabilizer device and an electric power steering device.

A power supply voltage required by the small electric power load is generally 12 V, and a power supply voltage required by the large electric power load is often higher than 12 V. Therefore, in a general vehicle having a 12 V power supply, a required 48 V power supply voltage or the like is obtained by stepping up a 12 V power supply voltage by a DC/DC converter mounted on each device having the large electric power load. In order to avoid an increase in electric power loss caused by an influence of a large current flowing through each large electric power load, it is necessary to use a thick electric wire having a large cross-sectional area for a power supply line of a wire harness. Therefore, a power supply required by the large electric power load is a factor of increasing cost of the entire vehicle.

On the other hand, in a case of a vehicle having two types of power supply systems as in JP-A-2019-193517, a voltage corresponding to a power supply voltage required by each electrical component can be supplied from a predetermined power supply system in a steady state. That is, electric power can be supplied from a 12 V in-vehicle battery to an electrical component requiring a 12 V power supply voltage, and electric power can be supplied from a 48 V in-vehicle battery to an electrical component requiring a 48 V power supply voltage.

However, in the system as disclosed in JP-A-2019-193517, since it is necessary to mount a power supply unit such as an in-vehicle battery for each of the voltages of 12 V and 48 V for the auxiliary device system, it is inevitable that cost of the entire vehicle is significantly increased.

However, when there are two types of power supply systems having different voltages, if only one in-vehicle battery is mounted, it is expected that power supply capability of the power supply is insufficient in a power supply system to which the in-vehicle battery is not directly connected. When a large electric power load is used, there is a concern that large fluctuation occurs in the power supply voltage and an operation of an in-vehicle device becomes unstable.

In order to prevent large electric power loss from occurring when power of a power supply is supplied to the large electric power load, it is necessary to form a power supply line of a wire harness by a thick electric wire. Since there is a possibility that relatively large voltage fluctuation occurs in the power supply voltage due to an influence of a large current flowing through the large electric power load, it is necessary to provide a load side circuit of a 12 V system with a margin for power supply voltage fluctuation, which leads to an increase in electric power loss.

The present disclosure has been made in view of the above circumstances, and an object of the present disclosure is to provide an in-vehicle power supply system capable of preventing an increase in cost of an entire vehicle, reducing a diameter of a power supply line in a wire harness, and reducing electric power loss.

The object of the present disclosure is achieved with the following configuration.

An in-vehicle power supply system configured to supply power of a power supply on a vehicle side to an in-vehicle device serving as a load on a vehicle, the in-vehicle power supply system including: a main battery configured to charge and discharge the power of the power supply; an upper power supply unit configured to supply the power of the power supply to the main battery; a first power supply line allocated to conduct the power of the power supply of a first voltage; a second power supply line allocated to conduct the power of the power supply of a second voltage lower than the first voltage; a step-down conversion unit configured to step down a voltage of the first power supply line to supply the power of the power supply to the second power supply line; and a capacitor, wherein the upper power supply unit, the capacitor, and an input of the step-down conversion unit are connected to the first power supply line, and wherein the main battery and an output of the step-down conversion unit are connected to the second power supply line.

An in-vehicle power supply system configured to supply power of a power supply on a vehicle side to an in-vehicle device serving as a load on a vehicle, the in-vehicle power supply system including: a main battery configured to charge and discharge the power of the power supply; an upper power supply unit configured to supply the power of the power supply power to the main battery; a first power supply line allocated to conduct the power of the power supply of a first voltage; a second power supply line allocated to conduct the power of the power supply of a second voltage lower than the first voltage; a step-down conversion unit configured to step down a voltage of the first power supply line to supply the power of the power supply to the second power supply line; and a capacitor, wherein the upper power supply unit, the main battery, and an input of the step-down conversion unit are connected to the first power supply line, and wherein an output of the step-down conversion unit and the capacitor are connected to the second power supply line.

An in-vehicle power supply system configured to supply power of a power supply on a vehicle side to an in-vehicle device serving as a load on a vehicle, the in-vehicle power supply system including: a main battery configured to charge and discharge the power of the power supply; an upper power supply unit configured to supply the power of the power supply to the main battery; a first power supply line allocated to conduct the power of the power supply of a first voltage; a second power supply line allocated to conduct the power of the power supply of a second voltage lower than the first voltage; a step-down conversion unit configured to step down a voltage of the first power supply line to supply the power of the power supply to the second power supply line; and a dark current supply circuit connected in parallel with the step-down conversion unit, wherein the upper power supply unit, the main battery, and an input of the step-down conversion unit are connected to the first power supply line, wherein an output of the step-down conversion unit is connected to the second power supply line, and wherein the dark current supply circuit is configured to supply the power of the power supply generated by stepping down a voltage of the first power supply line to the second power supply line as a dark current in a case in which an ignition of the vehicle is OFF.

According to the in-vehicle power supply system of the present disclosure, it is possible to prevent an increase in cost of the entire vehicle, and it is also possible to reduce a diameter of a power supply line in a wire harness and reduce electric power loss.

The present disclosure has been briefly described as above. Further, details of the present disclosure will be clarified by reading a mode (hereinafter, referred to as an "embodiment") for carrying out the disclosure to be described below with reference to accompanying drawings.

DESCRIPTION OF EMBODIMENTS

Specific embodiments of the present disclosure will be described below with reference to the drawings.

First Embodiment

Figure 1:
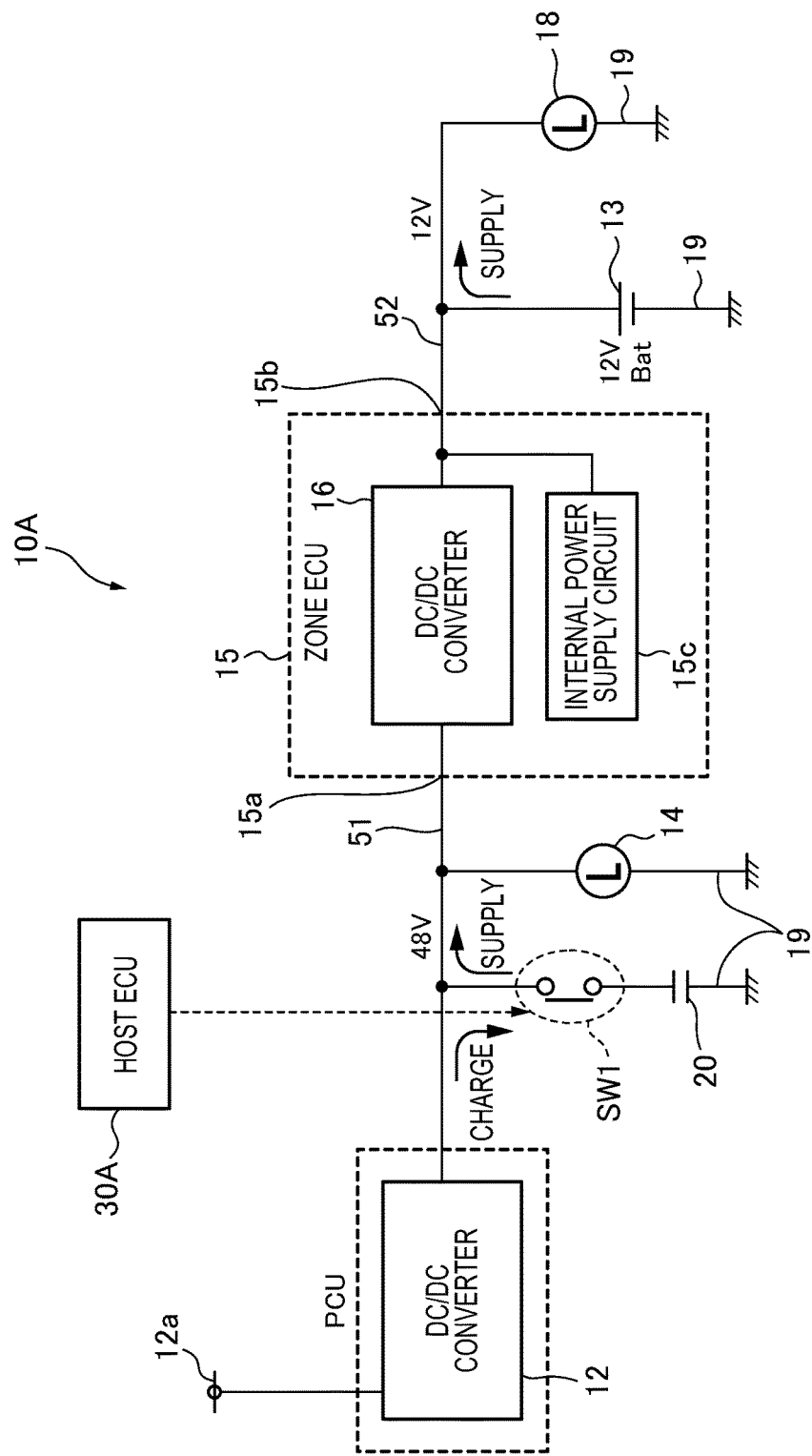
FIG. 1 is a block diagram showing main parts of an in-vehicle power supply system according to a first embodiment of the present disclosure.

FIG. 1 is a block diagram showing main parts of an in-vehicle power supply system 10A according to the first embodiment of the present disclosure.

The in-vehicle power supply system 10A shown in FIG. 1 is mounted on, for example, a hybrid car, an electric vehicle, or a general vehicle using only an engine as a drive source, and can be used for supplying power of a power supply to various electrical components in an auxiliary device system on a vehicle.

The in-vehicle power supply system 10A of FIG. 1 includes an auxiliary device system battery 13 that can supply power of a power supply to various loads in an auxiliary device system that do not belong to a vehicle drive system. The auxiliary device system battery 13 is a main battery in the auxiliary device system of the vehicle, and is a rechargeable secondary battery having a voltage specification of 12 V. A positive electrode side of the auxiliary device system battery 13 is connected to a second power supply line 52 of a system that handles power of a power supply having a voltage of 12 V. A negative electrode side of the auxiliary device system battery 13 is connected to a ground (earth) 19 of the vehicle.

On the other hand, an upstream side of a first power supply line 51 of a system that handles power of a power supply having a voltage of 48 V is connected to an output of a power supply control unit PCU. An input side of the power supply control unit PCU is connected to a drive system high-voltage power supply line 12a. The drive system high-voltage power supply line 12a can output power of a power supply of a DC high-voltage having about several hundred volts so as to supply large electric power to an electric motor that drives the vehicle. The power supply control unit PCU has a built-in DC/DC converter 12. The DC/DC converter 12 can step down a high voltage of the drive system high-voltage power supply line 12a to generate DC power of a power supply having a voltage of 48 V.

In a case of a general vehicle without the drive system high-voltage power supply line 12a, an alternator (ALT) is connected to the upstream side of the first power supply line 51 instead of the DC/DC converter 12.

Power of a power supply output by the power supply control unit PCU can be used to charge the auxiliary device system battery 13 and to supply the power of the power supply required by each load on the vehicle. However, when an ignition of the vehicle is OFF, the power supply control unit PCU does not supply the power of the power supply to a first power supply line 51 side.

As shown in FIG. 1, the output of the power supply control unit PCU, a capacitor 20, a large electric power load 14, and an input 15a of a zone ECU 15 are connected to the first power supply line 51. A switch circuit SW1 is connected between the capacitor 20 and the first power supply line 51.

The large electric power load 14 is an electrical component that consumes a very large amount of electric power among the various electrical components belonging to the auxiliary device system. For example, an electric stabilizer device and an electric power steering device mounted on the vehicle consume very large power of the power supply when the electric stabilizer device and the electric power steering device operate, and thus need to be handled as the large electric power load 14.

In a case of a general vehicle, power of a power supply having a voltage of 12 V is often supplied via a standard power supply line even for a large electric power load, and a large current flows through the large electric power load. Therefore, it is necessary to make a power supply line for supplying electric power to the large electric power load very thick.

On the other hand, in the in-vehicle power supply system 10A shown in FIG. 1, since power of a power supply having a voltage of 48 V is supplied from the first power supply line 51 to the large electric power load 14, it is possible to significantly reduce a current flowing through the large electric power load 14. Therefore, a diameter of a power supply line of the first power supply line 51 can be reduced. It is not necessary to install a step-up circuit inside the large electric power load 14.

However, when the large electric power load 14 is used, the large electric power load 14 temporarily consumes very large power of the power supply, so that the power of the power supply supplied from an output of the zone ECU 15 to the large electric power load 14 may be insufficient even when the ignition of the vehicle is ON. In order to compensate for insufficiency of the power of the power supply, the capacitor 20 is included in the in-vehicle power supply system 10A.

That is, by accumulating electric charge in the capacitor 20 in advance and discharging the electric charge accumulated in the capacitor 20 when the large electric power load 14 operates, it is possible to avoid insufficiency of the power of the power supply required by the large electric power load 14. It is also possible to prevent fluctuation in a power supply voltage on the second power supply line 52 or the like due to an operation of the large electric power load 14.

The capacitor 20 has a characteristic suitable for use in an application in which a large current is supplied for a relatively short time as compared with a storage battery such as the auxiliary device system battery 13. On the other hand, when the capacitor 20 is kept in a state in which electric charge is always stored therein, the characteristic is likely to deteriorate.

Therefore, in order to prevent the capacitor 20 from deteriorating, in the in-vehicle power supply system 10A of FIG. 1, a host ECU 30A performs opening and closing control of the switch circuit SW1 according to a situation, and performs charging and discharging of the electric charge in the capacitor 20 at an appropriate timing.

The zone ECU 15 is a device for managing power supply to a load in a specific zone on the vehicle, and has a built-in DC/DC converter 16 and an internal power supply circuit 15c. The zone managed by the zone ECU 15 may represent a specific region in a space on the vehicle or may represent a specific group in functional grouping. Therefore, a plurality of zone ECUs 15 independent of each other are usually installed on the vehicle.

The DC/DC converter 16 in the zone ECU 15 can output power of a 12 V DC power supply generated by stepping down power of a 48 V DC power supply input from the first power supply line 51 to the second power supply line 52. The DC/DC converter 16 can also output power of a 48 V DC power supply generated by stepping up power of a 12 V DC power supply input from the second power supply line 52 to the first power supply line 51.

As shown in FIG. 1, the auxiliary device system battery 13 and a small electric power load 18 are connected to the second power supply line 52 on a downstream side of the zone ECU 15. The second power supply line 52 belongs to a system that handles power of a power supply having a voltage of 12 V.

The small electric power load 18 corresponds to an electrical component that consumes a relatively small amount of electric power among various electrical components belonging to the auxiliary device system. For example, electrical components such as various ECUs, various lighting devices, an audio device, and a navigation device can be handled as the small electric power load 18.

In the in-vehicle power supply system 10A of FIG. 1, by supplying the second power supply line 52 with power of the 12 V power supply generated by stepping down power of the 48 V power supply appearing on the first power supply line 51 side by the DC/DC converter 16 in the zone ECU 15, the auxiliary device system battery 13 can be charged. Power of a power supply required by the small electric power load 18 can be normally supplied from the auxiliary device system battery 13.

On the other hand, power of a 12 V power supply supplied from the auxiliary device system battery 13 can be stepped up by the zone ECU 15 and supplied to the first power supply line 51, so that this electric power can be supplied to the large electric power load 14 or can be used to charge the capacitor 20. When the large electric power load 14 is driven, if a current flowing from a second power supply line 52 side to the large electric power load 14 on the first power supply line 51 side increases, voltage fluctuation is likely to occur in the second power supply line 52. Therefore, electric charge accumulated in the capacitor 20 in advance is supplied to the large electric power load 14, and the current flowing from the second power supply line 52 side to the first power supply line 51 side is reduced. Accordingly, voltage fluctuation of the second power supply line 52 can be prevented.

Figure 2:
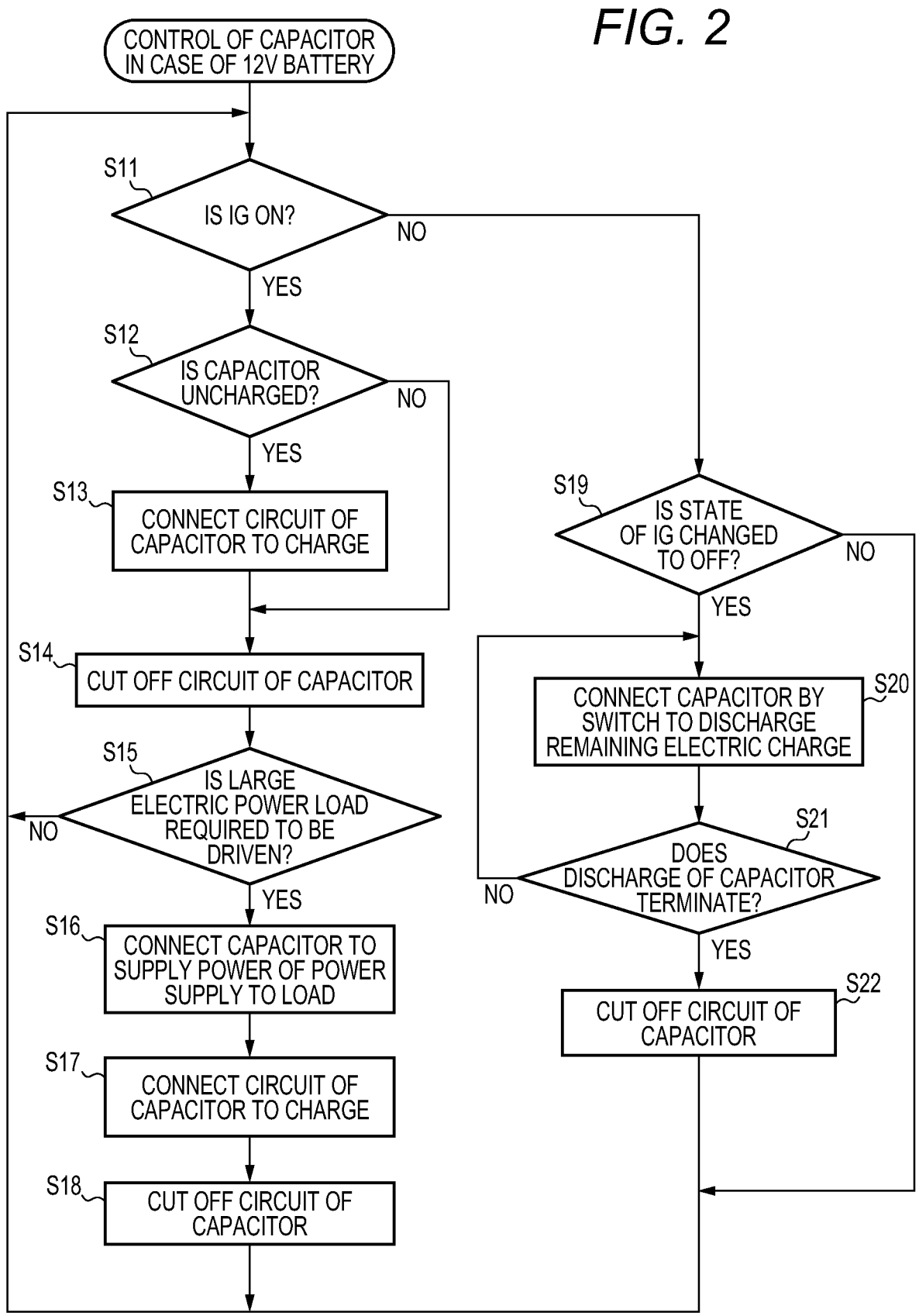
FIG. 2 is a flowchart showing main control in the in-vehicle power supply system of FIG. 1.

FIG. 2 is a flowchart showing main control in the in-vehicle power supply system 10A of FIG. 1. That is, by the host ECU 30A in FIG. 1 performing the control in FIG. 2, it is possible to control the switch circuit SW1 according to a situation of the vehicle and perform charging and discharging of the capacitor 20 at an appropriate timing. The control in FIG. 2 will be described below.

When the ignition (IG) of the vehicle is ON, the host ECU 30A proceeds from S11 to S12. If the capacitor 20 is not charged, the switch circuit SW1 is closed to charge the capacitor 20 (S13).

When the capacitor 20 is charged, power of a 48 V power supply output from the power supply control unit PCU can be supplied to the capacitor 20, or power of a 48 V power supply stepped up in the zone ECU 15 based on an output of the auxiliary device system battery 13 can be supplied from the first power supply line 51 via the switch circuit SW1 to the capacitor 20.

When charging of the capacitor 20 is completed, the host ECU 30A opens the switch circuit SW1 to cut off circuit connection of the capacitor 20 (S14). Whether charging of the capacitor 20 is completed can be grasped by, for example, monitoring a voltage or current of the first power supply line 51 or managing charging time.

The host ECU 30A monitors a state of a predetermined signal instructing start of energization of the large electric power load 14 in S15, and proceeds to the processing of S16 when the large electric power load 14 starts energization. The host ECU 30A closes the switch circuit SW1 to connect a circuit of the capacitor 20 to the first power supply line 51. Accordingly, electric charge accumulated in the capacitor 20 is discharged, and the power of the power supply is supplied via the first power supply line 51 to the large electric power load 14. A part of power of a power supply output from the zone ECU 15 to the first power supply line 51 is also supplied to the large electric power load 14 at the same time.

Since accumulated electric charge of the capacitor 20 becomes empty by execution of S16, after the energization of the large electric power load 14 is ended, the host ECU 30A proceeds to the next processing of S17 to charge the capacitor 20. Actually, by maintaining the switch circuit SW1 closed, the capacitor 20 is charged by the power of the power supply output from the power supply control unit PCU or the zone ECU 15.

When charging of the capacitor 20 is ended, the host ECU 30A opens the switch circuit SW1 to cut off the circuit connection of the capacitor 20 (S18).

On the other hand, when the ignition of the vehicle is changed from ON to OFF as in a case of parking the vehicle, the host ECU 30A proceeds to the processing of S20 through S11 to S19. The host ECU 30A closes the switch circuit SW1 to connect the capacitor 20 to the first power supply line 51.

When the ignition is OFF, most of various devices on the vehicle are stopped, but circuits of some devices consume a small amount of power of a power supply as a dark current. In a state where the switch circuit SW1 is closed in S20, the electric charge accumulated in the capacitor 20 is discharged to the first power supply line 51 as the dark current. Power of a 12 V power supply obtained by stepping down the power of the power supply of the first power supply line 51 in the zone ECU 15 can be supplied to the second power supply line 52 as the dark current.

By supplying the dark current, the electric charge accumulated in the capacitor 20 gradually decreases, and an electric charge amount becomes 0 after a while from start of the processing of S20. When the accumulated electric charge in the capacitor 20 becomes 0, that is, a discharge end state is reached, the host ECU 30A proceeds from S21 to S22, and opens the switch circuit SW. That is, the circuit of the capacitor 20 is cut off from the first power supply line 51.

That is, by performing the control shown in FIG. 2, when the large electric power load 14 is energized, the electric charge accumulated in the capacitor 20 can be efficiently used, and insufficiency of the power of the power supply consumed by the large electric power load 14 and voltage fluctuation in the first power supply line 51 can be prevented.

Further, when the ignition is OFF as in a case in which the vehicle is parked, the electric charge accumulated in the capacitor 20 is automatically discharged, so that it is possible to avoid deterioration of the characteristic of the capacitor 20.

Figure 3:
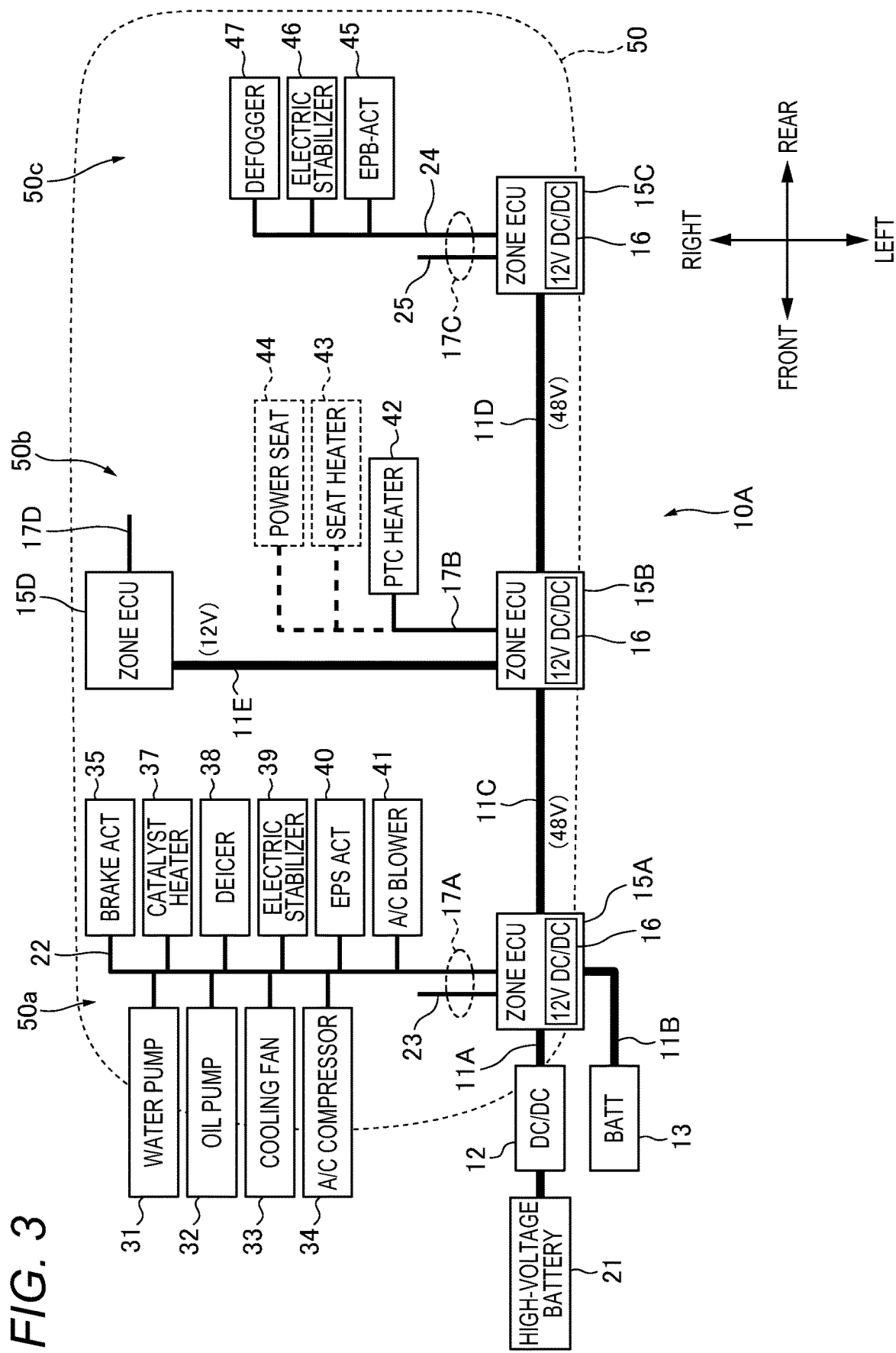
FIG. 3 is a block diagram showing a connection example of components installed in each part of a vehicle.

FIG. 3 is a block diagram showing a connection example of components installed in each part of the vehicle. That is, a specific configuration example of the in-vehicle power supply system 10A according to the embodiment of the present disclosure is shown in FIG. 3. FIG. 3 shows an outline of an arrangement example of main components in a state in which a vehicle is viewed from above.

A vehicle body 50 of the vehicle shown in FIG. 3 includes an engine room 50a, a vehicle cabin instrument panel region 50b, and a trunk room 50c. In the engine room 50a, various electrical components in the auxiliary device system such as a water pump 31, an oil pump 32, a cooling fan 33, an air conditioner (A/C) compressor 34, a brake actuator (ACT) 35, a catalyst heater 37, a deicer 38, an electric stabilizer 39, an electric power steering (EPS) actuator 40, and an air conditioner blower 41 are provided.

In a vehicle cabin, various electrical components in the auxiliary device system such as a positive temperature coefficient (PTC) heater 42, a seat heater 43, and a power seat 44 are provided. Inside the trunk room 50c, various electrical components in the auxiliary device system such as an electric power assist brake (EPB) actuator 45, an electric stabilizer 46, and a defogger 47 are provided.

In the example of the in-vehicle power supply system 10A shown in FIG. 3, a zone ECU 15A is installed in the engine room 50a in order to manage a zone allocated to the engine room 50a. In order to manage a left side zone and a right side zone of the vehicle cabin instrument panel region 50b, zone ECUs 15B and 15D are respectively installed at left and right portions of the vehicle cabin instrument panel region 50b. A zone ECU 15C is installed in the trunk room 50c in order to manage a zone allocated in the trunk room 50c.

The zone ECUs 15A and 15B are connected to each other by a power supply trunk line 11C, the zone ECUs 15B and 15C are connected to each other by a power supply trunk line 11D, and the zone ECUs 15B and 15D are connected to each other by a power supply trunk line 11E.

The DC/DC converter 12 and the auxiliary device system battery 13 are connected to the zone ECU 15A via power supply trunk lines 11A and 11B. An input side of the DC/DC converter 12 is connected to an output of a high-voltage battery 21. The high-voltage battery 21 is formed of a secondary battery such as a lithium ion battery, can store electric power having a high voltage, for example, about several hundred volts, and can supply the stored electric power to an electric motor for vehicle traveling or the like.

The DC/DC converter 12 converts power of a power supply of a DC high-voltage having about several hundred volts output from the high-voltage battery 21 into power of a 48 V DC power supply, and supplies the power of the 48 V DC power supply to the power supply trunk line 11A corresponding to the first power supply line 51 in FIG. 1.

The auxiliary device system battery 13 can be charged by inputting power of a DC power supply stepped down from 48 V to 12 V in the zone ECU 15A from a power supply trunk line 11B. Power of a 12 V DC power supply accumulated by the auxiliary device system battery 13 by charging can be output to the power supply trunk line 11B.

The power supply trunk lines 11A, 11B, 11C are electrically connected to one another inside the zone ECU 15A. The power supply trunk lines 11C and 11D are electrically connected to each other inside the zone ECU 15B. Therefore, the power of the 48 V DC power supply output from the DC/DC converter 12 or the power of the 12 V DC power supply output from the auxiliary device system battery 13 is supplied to the power supply trunk lines 11C and 11D. Each of the power supply trunk lines 11C and 11D includes a power supply line for distributing power of at least the 12 V DC power supply.

Each of the zone ECUs 15A, 15B, and 15C has the built-in DC/DC converter 16. Since there is no load that consumes large electric power in a zone managed by the zone ECU 15D, the zone ECU 15D is not mounted with the DC/DC converter 16. The power supply trunk line 11E connecting the zone ECUs 15B and 15D includes a power supply line for distributing power of the 12 V DC power supply.

As shown in FIG. 3, a power supply branch line 17A connected to a downstream side of the zone ECU 15A includes a 48 V power supply line 22 and a 12 V power supply line 23.

The 48 V power supply line 22 can supply power of a 48 V power supply output from the DC/DC converter 12 or power of a 48 V power supply generated by the DC/DC converter 16 in the zone ECU 15A by step-up conversion of power of a 12 V power supply.

The 12 V power supply line 23 can supply power of a 12 V power supply generated by step-down conversion of power of a 48 V power supply by the DC/DC converter 16 in the zone ECU 15A. The 12 V power supply line 23 can supply power of a 12 V power supply output from the auxiliary device system battery 13.

In the example shown in FIG. 3, the water pump 31, the oil pump 32, the cooling fan 33, the air conditioner compressor 34, the brake actuator 35, the catalyst heater 37, the deicer 38, the electric stabilizer 39, the EPS actuator 40, and the air conditioner blower 41 are connected to the 48 V power supply line 22.

In particular, since the electric stabilizer 39 and the EPS actuator 40 consume a very large amount of electric power, connecting the electric stabilizer 39 and the EPS actuator 40 to the 48 V power supply line 22 to which a 48 V voltage is supplied is effective for the purpose of reducing diameters of electric wires such as the 48 V power supply line 22 and the trunk line. Various small electric power loads requiring a 12 V power supply voltage can be connected to the 12 V power supply line 23.

On the other hand, the PTC heater 42, the seat heater 43, and the power seat 44 installed in the vehicle cabin are connected to a downstream side of the zone ECU 15B via a power supply branch line 17B. The power supply branch line 17B includes a power supply line that distributes 12 V electric power obtained by stepping down power of a 48 V power supply supplied to the power supply trunk line 11C by the DC/DC converter 16 in the zone ECU 15B.

A 12 V power supply line included in the power supply trunk line 11E is supplied with power of a 12 V power supply generated by stepping down a voltage by the DC/DC converter 16 in the zone ECU 15B. A power supply branch line 17D connected to a downstream side of the zone ECU 15D is supplied with power of a 12 V power supply obtained by distributing or branching electric power of the 12 V power supply line of the power supply trunk line 11E.

On the other hand, a power supply branch line 17C of the zone ECU 15C installed in the trunk room 50c includes a 48 V power supply line 24 and a 12 V power supply line 25. The 48 V power supply line 24 can output power of a 48 V power supply obtained by distributing or branching power of a 48 V power supply supplied from the power supply trunk line 11D in the zone ECU 15C.

The 12 V power supply line 25 can output power of a 12 V power supply obtained by stepping down power of a 48 V power supply supplied from the power supply trunk line 11D by the DC/DC converter 16 in the zone ECU 15C.

The EPB actuator 45, the electric stabilizer 46, and the defogger 47 installed in the trunk room 50c are connected to the 48 V power supply line 24. In particular, since the electric stabilizer 46 consumes a very large amount of electric power, connecting the electric stabilizer 46 to the 48 V power supply line 24 to which a 48 V voltage is supplied is effective for the purpose of reducing diameters of electric wires such as the 48 V power supply line 24 and the trunk line. Various small electric power loads requiring the 12 V power supply voltage can be connected to the 12 V power supply line 25.

In the in-vehicle power supply system 10A of FIG. 3, since a large electric power load is small in a zone on a right side of a vehicle cabin instrument panel managed by the zone ECU 15D, the zone ECU 15D that includes a 12 V power supply line and does not include the DC/DC converter 16 is installed in the power supply trunk line 11E. It is desirable that the power supply trunk line 11E also includes a 48 V power supply line, so that a large electric power load can also be connected to the downstream side of the zone ECU 15D.

Second Embodiment

Figure 4:
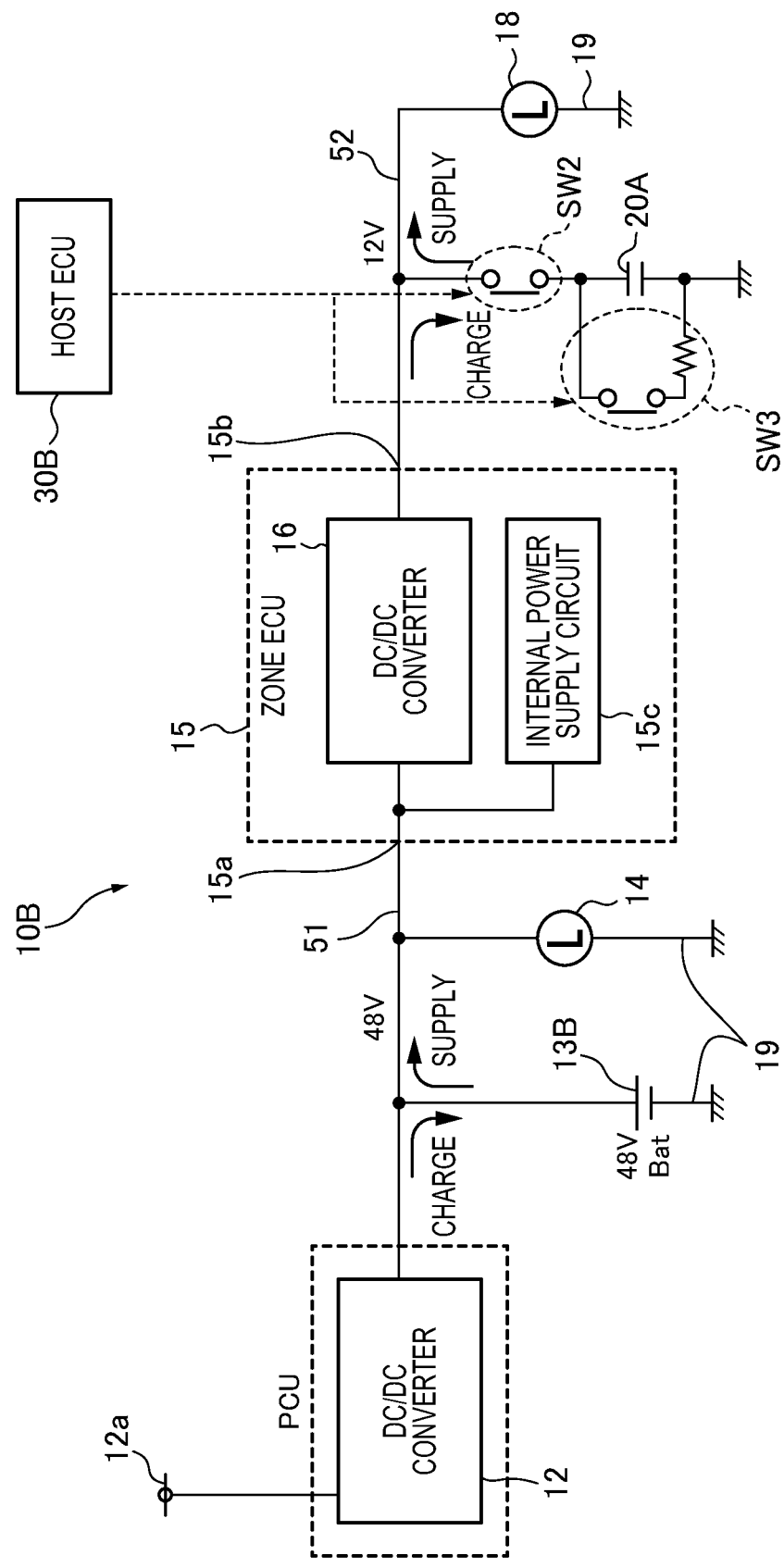
FIG. 4 is a block diagram showing main parts of an in-vehicle power supply system according to a second embodiment of the present disclosure.

FIG. 4 is a block diagram showing main parts of an in-vehicle power supply system 10B according to the second embodiment of the present disclosure. The in-vehicle power supply system 10B shown in FIG. 4 is a modification of the in-vehicle power supply system 10A shown in FIG. 1. In FIG. 4, the same components as those of the in-vehicle power supply system 10A are denoted by the same reference signs.

The in-vehicle power supply system 10B of FIG. 4 includes an auxiliary device system battery 13B that can supply power of a power supply to various loads in an auxiliary device system that do not belong to a vehicle drive system. The auxiliary device system battery 13B is a main battery in the auxiliary device system corresponding to a 48 V voltage, and is a rechargeable secondary battery. The auxiliary device system battery 13B is, for example, a lithium ion battery. A positive electrode side of the auxiliary device system battery 13B is connected to the first power supply line 51. A negative electrode side of the auxiliary device system battery 13B is connected to a ground 19 of a vehicle.

An upstream side of the first power supply line 51 that handles a 48 V voltage is connected to an output of the power supply control unit PCU. An input side of the power supply control unit PCU is connected to the drive system high-voltage power supply line 12a. The drive system high-voltage power supply line 12a can output power of a power supply of a DC high-voltage having about several hundred volts so as to supply large electric power to an electric motor that drives the vehicle. The power supply control unit PCU has the built-in DC/DC converter 12. The DC/DC converter 12 can step down a high voltage of the drive system high-voltage power supply line 12a to generate power of a DC power supply having a voltage of 48 V.

In a case of a general vehicle without the drive system high-voltage power supply line 12a, an alternator is connected to the upstream side of the first power supply line 51 instead of the DC/DC converter 12.

Power of a power supply output by the power supply control unit PCU can be used to supply power of a power supply required by the in-vehicle power supply system 10B and each load connected to a downstream side of the in-vehicle power supply system 10B. However, when an ignition of the vehicle is OFF, the power supply control unit PCU does not supply power of a power supply to a first power supply line 51 side.

As shown in FIG. 4, the output of the power supply control unit PCU, the auxiliary device system battery 13B, the large electric power load 14, and the input 15a of the zone ECU 15 are connected to the first power supply line 51.

Therefore, when the ignition of the vehicle is ON, power of a 48 V power supply output from the power supply control unit PCU can be supplied via the first power supply line 51 to the auxiliary device system battery 13B to charge the auxiliary device system battery 13B.

The large electric power load 14 is an electrical component that consumes a very large amount of electric power among the various electrical components belonging to the auxiliary device system.

In the in-vehicle power supply system 10B shown in FIG. 4, since the power of the power supply having a voltage of 48 V is supplied from the first power supply line 51 to the large electric power load 14, it is possible to significantly reduce a current flowing through the large electric power load 14. Therefore, a diameter of a power supply line of the first power supply line 51 can be reduced. It is not necessary to install a step-up circuit inside the large electric power load 14.

Power of a 48 V power supply accumulated in the auxiliary device system battery 13B can be supplied via the first power supply line 51 to the large electric power load 14. When the ignition is ON, the power of the 48 V power supply can also be supplied from the output of the power supply control unit PCU to the large electric power load 14.

The in-vehicle power supply system 10B can supply the power of the 48 V power supply accumulated in the auxiliary device system battery 13B and the power of the 48 V power supply output from the power supply control unit PCU to the zone ECU 15 and a downstream side of the zone ECU 15.

The zone ECU 15 has the built-in DC/DC converter 16 and the internal power supply circuit 15c. The zone ECU 15 has the input 15a connected to the first power supply line 51 and an output 15b connected to the second power supply line 52.

The DC/DC converter 16 in the zone ECU 15 can generate, based on power of a DC power supply having a voltage of 48 V supplied from the first power supply line 51 side, power of a DC power supply having a voltage stepped down to 12 V. The power of the 12 V DC power supply generated by the DC/DC converter 16 is supplied from the output 15b of the zone ECU 15 to the second power supply line 52.

As shown in FIG. 4, the output 15b of the zone ECU 15, a capacitor 20A, and the small electric power load 18 are connected to the second power supply line 52.

One end (high potential side) of the capacitor 20A is connected to the second power supply line 52 via a switch circuit SW2, and the other end (low potential side) of the capacitor 20A is connected to the ground 19. A switch circuit SW3 is connected in parallel with the capacitor 20A. The switch circuit SW3 includes one switch and a resistor connected in series.

The switch circuits SW2 and SW3 can be individually opened and closed by control signals output from a host ECU 30B. The switch circuit SW2 is controlled to be closed when performing a charging operation for accumulating electric charge in the capacitor 20A and when supplying the electric charge accumulated in the capacitor 20A to a load side, and to be opened in other cases. When the electric charge accumulated in the capacitor 20A becomes unnecessary, the switch circuit SW3 is controlled to be closed in order to discharge the electric charge.

The small electric power load 18 corresponds to an electrical component that consumes a relatively small amount of electric power among various electrical components belonging to the auxiliary device system. For example, electrical components such as various ECUs, various lighting devices, an audio device, and a navigation device can be handled as the small electric power load 18.

When the ignition of the vehicle is ON, power of a power supply output from the auxiliary device system battery 13B can be supplied via the first power supply line 51 to the zone ECU 15. The power of the 12 V power supply generated by step-down by the DC/DC converter 16 in the zone ECU 15 is supplied to the second power supply line 52, so that necessary power of a power supply can be supplied to the small electric power load 18 connected to the second power supply line 52.

On the other hand, when the ignition is OFF, the small electric power load 18 and the like hardly operate, but some circuits consume a small amount of power of a power supply as a dark current as necessary.

When the DC/DC converter 16 in the zone ECU 15 is always operated in order to enable supply of the dark current, relatively large electric power loss always occurs in the DC/DC converter 16. When the ignition is OFF, electric power is not supplied from a power supply control unit PCU side, so that a consumption amount of electric power accumulated in the auxiliary device system battery 13B increases, and battery exhaustion is likely to occur.

However, in the present embodiment, the electric charge accumulated in the capacitor 20A can be used when the ignition is OFF. Accordingly, it is not necessary to always operate the DC/DC converter 16, and it is possible to prevent an increase in electric power loss. The electric charge accumulated in the capacitor 20A is intermittently charged by using electric power of the auxiliary device system battery 13B when the ignition is OFF. Accordingly, power of a power supply (dark current) can be supplied from the capacitor 20A to the small electric power load 18 and the like when necessary. That is, an operation of the DC/DC converter 16 when the ignition is OFF can be limited to a temporary operation, and an increase in electric power loss can be prevented.

The capacitor 20A has a characteristic suitable for use in an application in which a large current is supplied for a relatively short time as compared with a storage battery such as the auxiliary device system battery 13B. On the other hand, when the capacitor 20A is kept in a state in which electric charge is always stored therein, deterioration of the characteristic is likely to progress in a short period of time.

Therefore, in order to prevent the capacitor 20A from deteriorating, in the in-vehicle power supply system 10B of FIG. 4, the host ECU 30B performs opening and closing control of the switch circuits SW2 and SW3 according to a situation, and performs charging and discharging of the electric charge in the capacitor 20A at an appropriate timing. For example, when the ignition is ON, the switch circuit SW3 is closed to discharge the electric charge accumulated in the capacitor 20A.

Figure 5:
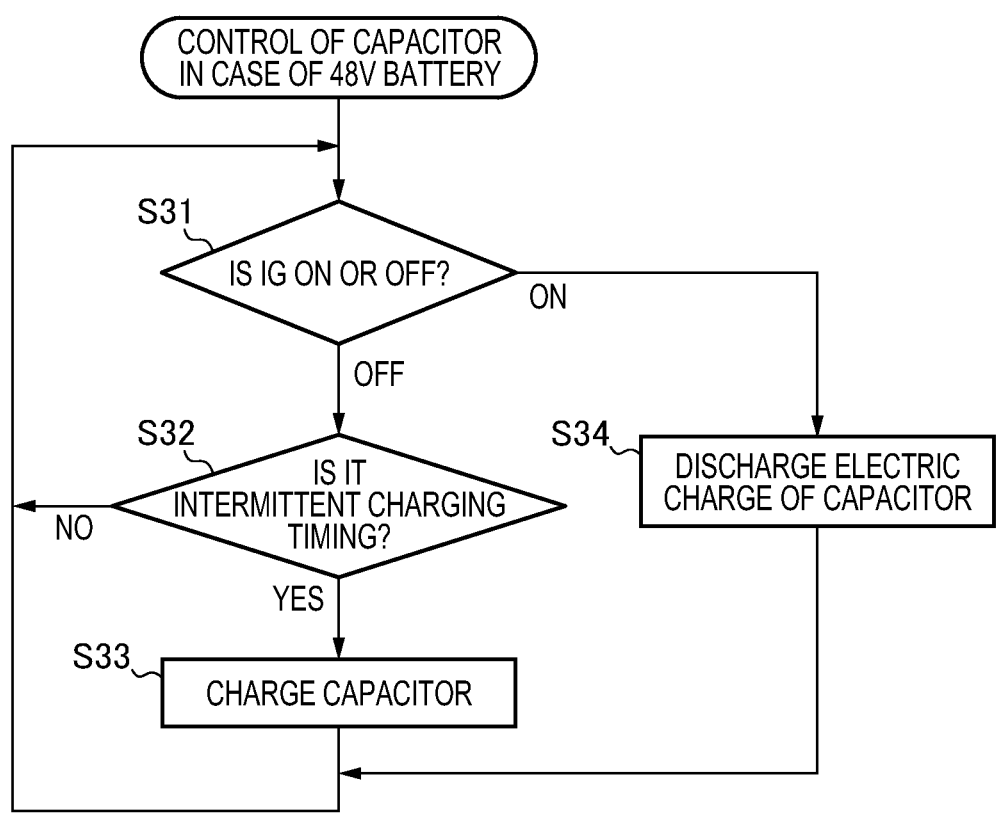
FIG. 5 is a flowchart showing main control in the in-vehicle power supply system of FIG. 4.

FIG. 5 is a flowchart showing main control in the in-vehicle power supply system 10B of FIG. 4. That is, the host ECU 30B in FIG. 4 maintains the capacitor 20A in an appropriate state by performing the control in FIG. 5. The control in FIG. 5 will be described below.

The host ECU 30B identifies whether the ignition (IG) of the vehicle is ON or OFF in S31, and proceeds from S31 to S32 when the ignition is OFF, and proceeds from S31 to S34 when the ignition is ON.

In the present embodiment, when the ignition is OFF, a charging processing of the capacitor 20A is executed "as intermittent charging" at a predetermined constant time interval. That is, the host ECU 30B proceeds to the processing from S32 to S33 each time timing of intermittent charging comes. Then, the switch circuit SW2 is closed to cause a current to flow from the second power supply line 52 to the capacitor 20A to charge the capacitor 20A (S33). At this time, the switch circuit SW3 is kept open.

When the capacitor 20A is charged, the DC/DC converter 16 is temporarily operated to step down the power of the 48 V power supply supplied from the auxiliary device system battery 13B to 12 V in the DC/DC converter 16 and supply the stepped-down power of the power supply to the second power supply line 52.

In a case in which a load requiring supply of a dark current is connected to the second power supply line 52, when the ignition is OFF, the switch circuit SW2 is closed as necessary, the electric charge accumulated in the capacitor 20A is discharged toward the second power supply line 52, and the dark current is supplied to the load.

On the other hand, when the ignition is ON, the host ECU 30B opens the switch circuit SW2 and closes the switch circuit SW3 (S34). Accordingly, the electric charge accumulated in the capacitor 20A is discharged little by little through the resistor in the switch circuit SW3. An accumulated electric charge amount of the capacitor 20A becomes 0 with passage of time. Accordingly, deterioration of the characteristic of the capacitor 20A can be prevented.

Third Embodiment

Figure 6:
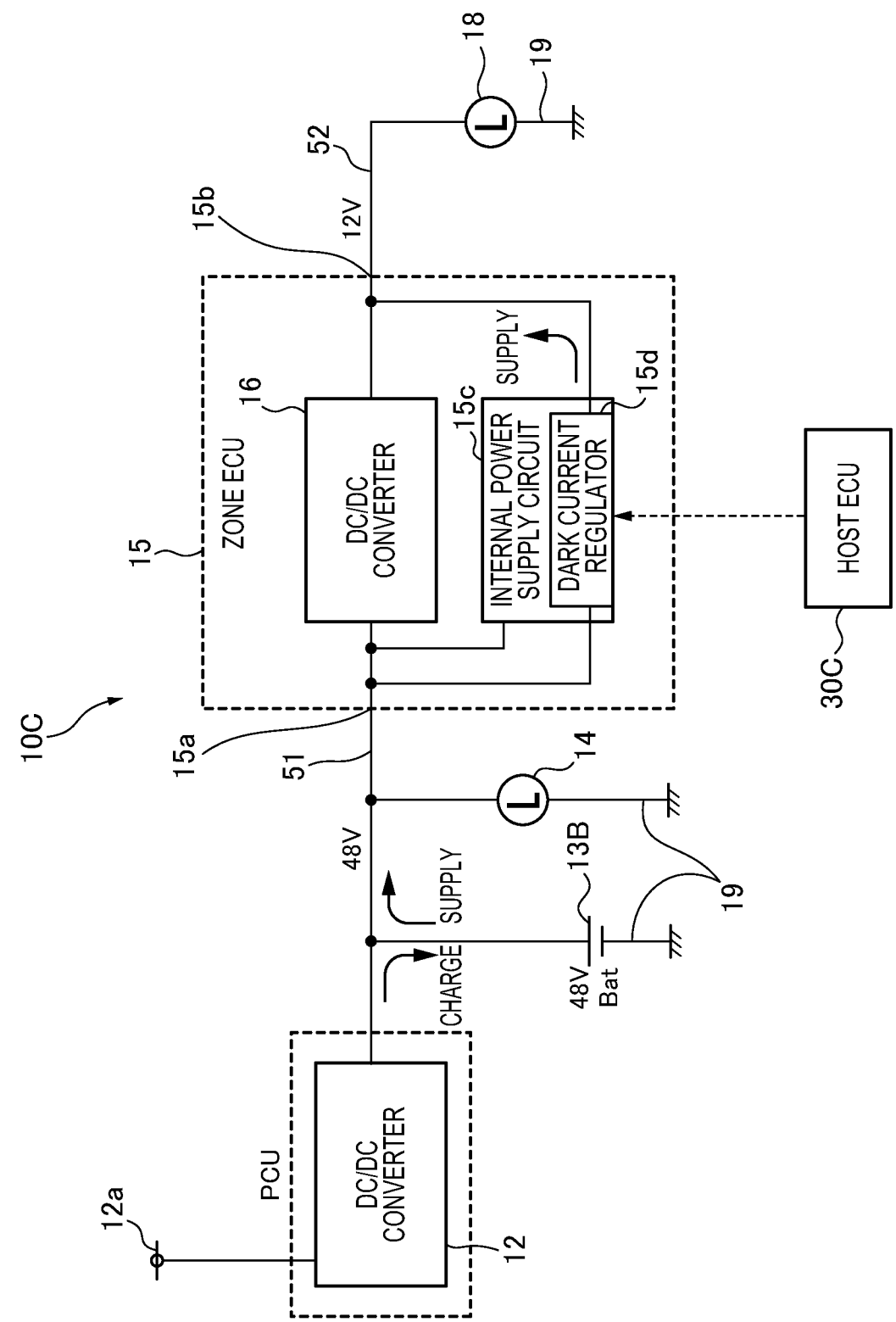
FIG. 6 is a block diagram showing main parts of an in-vehicle power supply system according to a third embodiment of the present disclosure.

FIG. 6 is a block diagram showing main parts of an in-vehicle power supply system 10C according to the third embodiment of the present disclosure. The in-vehicle power supply system 10C shown in FIG. 6 is a modification of the in-vehicle power supply system 10B shown in FIG. 4. In FIG. 6, the same components as those of the in-vehicle power supply system 10B are denoted by the same reference signs.

The in-vehicle power supply system 10C of FIG. 6 includes the auxiliary device system battery 13B that can supply power of a power supply to various loads in an auxiliary device system that do not belong to a vehicle drive system. The auxiliary device system battery 13B is a main battery in the auxiliary device system corresponding to a 48 V voltage, and is a rechargeable secondary battery. The auxiliary device system battery 13B is, for example, a lithium ion battery. A positive electrode side of the auxiliary device system battery 13B is connected to the first power supply line 51. A negative electrode side of the auxiliary device system battery 13B is connected to the ground 19 of a vehicle.

An upstream side of the first power supply line 51 that handles a 48 V voltage is connected to an output of the power supply control unit PCU. An input side of the power supply control unit PCU is connected to the drive system high-voltage power supply line 12a. The drive system high-voltage power supply line 12a can output power of a power supply of a DC high-voltage having about several hundred volts so as to supply large electric power to an electric motor that drives the vehicle. The power supply control unit PCU has the built-in DC/DC converter 12. The DC/DC converter 12 can step down a high voltage of the drive system high-voltage power supply line 12a to generate power of a DC power supply having a voltage of 48 V.

In a case of a general vehicle without the drive system high-voltage power supply line 12a, an alternator is connected to the upstream side of the first power supply line 51 instead of the DC/DC converter 12.

Power of a power supply output by the power supply control unit PCU can be used to supply power of a power supply required by the in-vehicle power supply system 10C and each load connected to a downstream side of the in-vehicle power supply system 10C. However, when an ignition of the vehicle is OFF, the power supply control unit PCU does not supply power of a power supply to a first power supply line 51 side.

As shown in FIG. 6, the output of the power supply control unit PCU, the auxiliary device system battery 13B, the large electric power load 14, and the input 15a of the zone ECU 15 are connected to the first power supply line 51.

Therefore, when the ignition of the vehicle is ON, the power of the 48 V power supply output from the power supply control unit PCU can be supplied via the first power supply line 51 to the auxiliary device system battery 13B to charge the auxiliary device system battery 13B.

The large electric power load 14 is an electrical component that consumes a very large amount of electric power among the various electrical components belonging to the auxiliary device system.

In the in-vehicle power supply system 10B shown in FIG. 4, since the power of the power supply having a voltage of 48 V is supplied from the first power supply line 51 to the large electric power load 14, it is possible to significantly reduce a current flowing through the large electric power load 14. Therefore, a diameter of a power supply line of the first power supply line 51 can be reduced. It is not necessary to install a step-up circuit inside the large electric power load 14.

Power of a 48 V power supply accumulated in the auxiliary device system battery 13B can be supplied via the first power supply line 51 to the large electric power load 14. When the ignition is ON, power of a 48 V power supply can be supplied from the output of the power supply control unit PCU to the large electric power load 14.

The in-vehicle power supply system 10C can supply the power of the 48 V power supply accumulated in the auxiliary device system battery 13B and the power of the 48 V power supply output from the power supply control unit PCU to the zone ECU 15 and a downstream side of the zone ECU 15.

The zone ECU 15 has the input 15a connected to the first power supply line 51 and the output 15b connected to the second power supply line 52. The zone ECU 15 has the built-in DC/DC converter 16 and the internal power supply circuit 15c. The internal power supply circuit 15c of the in-vehicle power supply system 10C includes a dark current regulator 15d.

An input side of the dark current regulator 15d is connected to the first power supply line 51, and an output side of the dark current regulator 15d is connected to the second power supply line 52. A host ECU 30C controls the dark current regulator 15d.

The DC/DC converter 16 in the zone ECU 15 can generate, based on power of a DC power supply having a voltage of 48 V supplied from the first power supply line 51 side, power of a DC power supply having a voltage stepped down to 12 V. The power of the 12 V DC power supply generated by the DC/DC converter 16 is supplied from the output 15b of the zone ECU 15 to the second power supply line 52.

In the in-vehicle power supply system 10C of FIG. 6, the dark current regulator 15d in the zone ECU 15 can generate, based on the power of the DC power supply having a voltage of 48 V supplied from the first power supply line 51 side, the power of the DC power supply having a voltage stepped down to 12 V. In this case, the power of the 12 V DC power supply generated by the dark current regulator 15d is supplied from the output 15b of the zone ECU 15 to the second power supply line 52.

Capacity of the power of the power supply that can be generated by the dark current regulator 15d is very small as compared with other power supply circuits. Therefore, the power of the 12 V power supply can be supplied only to a load that requires very small power of a power supply such as a dark current. Instead, electric power loss occurred when the dark current regulator 15d is used is also very small as compared with other circuits.

Specifically, when the 48 V voltage on the first power supply line 51 side is stepped down to 12 V and supplied to the second power supply line 52 side using the DC/DC converter 16, a relatively large electric power loss is expected to occur inside the DC/DC converter 16. However, when an operation of the DC/DC converter 16 is stopped and the dark current regulator 15*d* is used, the power of the 12 V power supply generated by stepping down the power of the 48 V power supply on the first power supply line 51 side with low loss can be supplied to the second power supply line 52.

When the ignition is OFF, the small electric power load 18 connected to the second power supply line 52 side is in a standby state and is in a state of consuming only a small dark current, so that only the power of the power supply supplied by the dark current regulator 15*d* is sufficient.

When the ignition is ON, the host ECU 30C controls the DC/DC converter 16 to be in an always operable state, and stops an operation of the dark current regulator 15*d*. When the ignition is OFF, an operation of the DC/DC converter 16 is stopped, and the dark current regulator 15*d* is switched to an operable state.

That is, in the in-vehicle power supply system 10C, when the ignition is ON, the DC/DC converter 16 in the zone ECU 15 operates to generate, based on the power of the 48 V power supply on the first power supply line 51 side, power of a 12 V power supply required by the small electric power load 18 and the like connected to the second power supply line 52. In the in-vehicle power supply system 10C, when the ignition is OFF, the DC/DC converter 16 is not used, and the dark current regulator 15*d* is used instead to generate, based on the power of the 48 V power supply on the first power supply line 51 side, power of a 12 V power supply required by the small electric power load 18 and the like connected to the second power supply line 52.

As described above, in the present embodiment, since the dark current regulator 15*d* is used when the ignition is OFF, the DC/DC converter 16 can be stopped. Accordingly, it is possible to prevent an increase in electric power loss and prevent battery exhaustion of the auxiliary device system battery 13B.

As described above, in the in-vehicle power supply system 10A shown in FIG. 1, since the power of the 48 V power supply is supplied from the first power supply line 51 to the large electric power load 14, it is possible to reduce a current flowing through the first power supply line 51 when the large power load 14 is driven. Therefore, it is easy to reduce a diameter of an electric wire at a location of the first power supply line 51 and the like and to reduce a size of a terminal.

In addition, since the electric charge accumulated in the capacitor 20 can be supplied via the first power supply line 51 to the large electric power load 14, it is possible to eliminate a temporary electric power insufficiency when the power is supplied to the large electric power load 14 is energized and to prevent fluctuation in a power supply voltage generated in the second power supply line 52. Accordingly, since a voltage of the second power supply line 52 is stabilized, it is possible to reduce a margin in a specification of a power supply voltage supplied to the small electric power load 18, and it is possible to reduce loss of electric power generated in a power supply circuit in the small electric power load 18. By connecting the auxiliary device system battery 13 to the second power supply line 52 side, it is possible to prevent an increase in cost.

Since the host ECU 30A performs the control shown in FIG. 2, it is possible to automatically discharge the electric charge accumulated in the capacitor 20 when the ignition is OFF. Accordingly, deterioration of the characteristic of the capacitor 20 can be prevented.

In the in-vehicle power supply system 10B shown in FIG. 4, by connecting the auxiliary device system battery 13B only to the first power supply line 51 side, it is possible to prevent an increase in cost. By connecting the capacitor 20A to the second power supply line 52, a dark current of power supply required by the small electric power load 18 when the ignition is OFF can be supplied from the capacitor 20A without always operating the DC/DC converter 16. Accordingly, it is possible to reduce electric power loss occurred in the DC/DC converter 16 when the ignition is OFF.

Since the host ECU 30B performs the control of FIG. 5, the capacitor 20A can be intermittently charged when the ignition is OFF, and the charged electric charge can be used. Further, since the electric charge accumulated in the capacitor 20A is automatically discharged when the ignition is ON, deterioration of the characteristic of the capacitor 20A can be prevented.

Also in the in-vehicle power supply system 10C shown in FIG. 6, by connecting the auxiliary device system battery 13B only to the first power supply line 51 side, it is possible to prevent an increase in cost. By using the dark current regulator 15*d* in the zone ECU 15, it is possible to supply a dark current of power supply required by the small electric power load 18 when the ignition is OFF while the DC/DC converter 16 is stopped. By using the dedicated dark current regulator 15*d*, it is possible to significantly reduce electric power loss occurred when the ignition is OFF as compared with a case of using the DC/DC converter 16.

The present disclosure is not limited to the above embodiments, and modifications, improvements, and the like can be made as appropriate. In addition, materials, shapes, dimensions, numbers, arrangement locations or the like of components in the embodiments described above are optional and are not limited as long as the present invention can be achieved.

Here, the in-vehicle power supply system according to the above embodiments of the present disclosure will be briefly summarized below.

An in-vehicle power supply system (10A) is configured to supply power of a power supply on a vehicle side to an in-vehicle device serving as a load on a vehicle. The in-vehicle power supply system includes: a main battery (auxiliary device system battery 13) configured to charge and discharge the power of the power supply; an upper power supply unit (power supply control unit PCU) configured to supply the power of the power supply to the main battery; a first power supply line (51) allocated to conduct the power supply of a first voltage (for example, 48 V); a second power supply line (52) allocated to conduct the power of the power supply of a second voltage (for example, 12 V) lower than the first voltage; a step-down conversion unit (DC/DC converter 16) configured to step down a voltage of the first power supply line to supply the power of the power supply to the second power supply line; and a capacitor (20). The upper power supply unit, the capacitor, and an input of the step-down conversion unit are connected to the first power supply line, and the main battery and an output of the step-down conversion unit are connected to the second power supply line.

According to the in-vehicle power supply system having the above configuration, when a large electric power load is connected to the first power supply line, sufficient electric power can be supplied to the large electric power load using electric charge in the capacitor. Accordingly, voltage fluctuation of the second power supply line can be prevented.

The in-vehicle power supply system (10A) further includes: a switch unit (switch circuit SW1) configured to control circuit connection between the capacitor and the first power supply line; and a control unit (host ECU 30A) configured to control the switch unit. The control unit is configured to: control the switch unit to perform discharge of the capacitor in conjunction with switching of an ignition of the vehicle to OFF (S20); and control the switch unit to cause electric charge accumulated in the capacitor to be discharged in a case in which the power of the power supply is required to be supplied to at least a large electric power load while the ignition is in an ON state (S15, S16).

According to the in-vehicle power supply system having the above configuration, it is possible to prevent electric charge from accumulating in the capacitor for a long time, so that deterioration of the capacitor can be prevented. Electric power can be supplied to the large electric power load using the capacitor when necessary.

An in-vehicle power supply system (10B) is configured to supply power of a power supply on a vehicle side to an in-vehicle device serving as a load on a vehicle. The in-vehicle power supply system includes: a main battery (auxiliary device system battery 13B) configured to charge and discharge the power of the power supply; an upper power supply unit (power supply control unit PCU) configured to supply the power of the power supply to the main battery; a first power supply line (51) allocated to conduct the power of the power supply of a first voltage (for example, 48 V); a second power supply line (52) allocated to conduct the power of the power supply of a second voltage (for example, 12 V) lower than the first voltage; a step-down conversion unit (DC/DC converter 16) configured to step down a voltage of the first power supply line to supply the power of the power supply to the second power supply line; and a capacitor (20A). The upper power supply unit, the main battery, and an input of the step-down conversion unit are connected to the first power supply line, and an output of the step-down conversion unit and the capacitor are connected to the second power supply line.

According to the in-vehicle power supply system having the above configuration, the power of the power supply for the dark current required when the ignition is OFF can be supplied from the capacitor, so that it is not necessary to always operate the step-down conversion unit, and it is possible to prevent occurrence of electric power loss. Accordingly, occurrence of battery exhaustion can be prevented.

The in-vehicle power supply system (10B) further includes: a switch unit (switch circuit SW2, SW3) configured to control circuit connection between the capacitor and the second power supply line; and a control unit (host ECU 30B) configured to control the switch unit. The control unit is configured to: control the switch unit to charge the capacitor in a case in which a predetermined condition is satisfied while an ignition of the vehicle is OFF (S33); and control the switch unit to perform discharge of the capacitor while the ignition is ON (S34).

According to the in-vehicle power supply system having the above configuration, it is possible to accumulate required electric charge in the capacitor without always operating the step-down conversion unit. Since unnecessary electric charge is automatically discharged, deterioration of the capacitor can be prevented.

An in-vehicle power supply system (10C) is configured to supply power of a power supply on a vehicle side to an in-vehicle device serving as a load on a vehicle. The in-vehicle power supply system includes: a main battery (auxiliary device system battery 13B) configured to charge and discharge the power of the power supply; an upper power supply unit (power supply control unit PCU) configured to supply the power of the power supply to the main battery; a first power supply line (51) allocated to conduct the power of the power supply of a first voltage (for example, 48 V); a second power supply line (52) allocated to conduct the power of the power supply of a second voltage (for example, 12 V) lower than the first voltage; a step-down conversion unit (DC/DC converter 16) configured to step down a voltage of the first power supply line to supply the power of the power supply to the second power supply line; and a dark current supply circuit (dark current regulator 15d) connected in parallel with the step-down conversion unit. The upper power supply unit, the main battery, and an input of the step-down conversion unit are connected to the first power supply line, and an output of the step-down conversion unit is connected to the second power supply line. The dark current supply circuit is configured to supply the power of the power supply generated by stepping down a voltage of the first power supply line to the second power supply line as a dark current in a case in which an ignition of the vehicle is OFF.

According to the in-vehicle power supply system having the above configuration, the power of the power supply for the dark current required when the ignition is OFF can be supplied from the dark current supply circuit, so that it is not necessary to always operate the step-down conversion unit, and it is possible to prevent occurrence of electric power loss. Accordingly, occurrence of battery exhaustion can be prevented.

What is claimed is:

1. An in-vehicle power supply system configured to supply power of a power supply on a vehicle side to an in-vehicle device serving as a load on a vehicle, the in-vehicle power supply system comprising:
    a main battery configured to charge and discharge the power of the power supply;
    an upper power supply unit configured to supply the power of the power supply to the main battery;
    a first power supply line allocated to conduct the power of the power supply of a first voltage;
    a second power supply line allocated to conduct the power of the power supply of a second voltage lower than the first voltage;
    a step-down conversion unit configured to step down a voltage of the first power supply line to supply the power of the power supply to the second power supply line;
    a capacitor; and
    a switch unit configured to control circuit connection between the capacitor and the first power supply line; and
    a control unit configured to control the switch unit,
    wherein the upper power supply unit, the capacitor, and an input of the step-down conversion unit are connected to the first power supply line,
    wherein the main battery and an output of the step-down conversion unit are connected to the second power supply line, and
    wherein the control unit is configured to:
       control the switch unit to perform discharge of the capacitor in conjunction with switching of an ignition of the vehicle to OFF; and
       control the switch unit to cause electric charge accumulated in the capacitor to be discharged in a case in which the power of the power supply is required to be supplied to at least a large electric power load while the ignition is in an ON state.

2. An in-vehicle power supply system configured to supply power of a power supply on a vehicle side to an in-vehicle device serving as a load on a vehicle, the in-vehicle power supply system comprising:
- a main battery configured to charge and discharge the power of the power supply;
- an upper power supply unit configured to supply the power of the power supply power to the main battery;
- a first power supply line allocated to conduct the power of the power supply of a first voltage;
- a second power supply line allocated to conduct the power of the power supply of a second voltage lower than the first voltage;
- a step-down conversion unit configured to step down a voltage of the first power supply line to supply the power of the power supply to the second power supply line;
- a capacitor;
- a switch unit configured to control circuit connection between the capacitor and the second power supply line; and
- a control unit configured to control the switch unit,
- wherein the upper power supply unit, the main battery, and an input of the step-down conversion unit are connected to the first power supply line,
- wherein an output of the step-down conversion unit and the capacitor are connected to the second power supply line, and
- wherein the control unit is configured to:
  - control the switch unit to charge the capacitor in a case in which a predetermined condition is satisfied while an ignition of the vehicle is OFF; and
  - control the switch unit to perform discharge of the capacitor while the ignition is ON.

3. An in-vehicle power supply system configured to supply power of a power supply on a vehicle side to an in-vehicle device serving as a load on a vehicle, the in-vehicle power supply system comprising:
- a main battery configured to charge and discharge the power of the power supply;
- an upper power supply unit configured to supply the power of the power supply to the main battery;
- a first power supply line allocated to conduct the power of the power supply of a first voltage;
- a second power supply line allocated to conduct the power of the power supply of a second voltage lower than the first voltage;
- a step-down conversion unit configured to step down a voltage of the first power supply line to supply the power of the power supply to the second power supply line; and
- a dark current supply circuit connected in parallel with the step-down conversion unit,
  - wherein the upper power supply unit, the main battery, and an input of the step-down conversion unit are connected to the first power supply line,
- wherein an output of the step-down conversion unit is connected to the second power supply line, and
- wherein the dark current supply circuit is configured to supply the power of the power supply generated by stepping down a voltage of the first power supply line to the second power supply line as a dark current in a case in which an ignition of the vehicle is OFF.

* * * * *